United States Patent

Giordano, Jr. et al.

[11] Patent Number: 5,813,093
[45] Date of Patent: Sep. 29, 1998

[54] HINGE ASSEMBLY

[75] Inventors: Joseph James Giordano, Jr., Belle Mead; James R. Graham, Bedminster; William Vincent Jackwicz, Spring Lake Heights; Pratod V. Kasbekar, Manalapan; Harish Shankar Mangrulkar, Colonia; Romano M. Zambon, Sea Bright, all of N.J.

[73] Assignee: Lucent Technologies Inc., Murray Hill, N.J.

[21] Appl. No.: 792,305

[22] Filed: Jan. 31, 1997

[51] Int. Cl.[6] ..................................................... E05D 11/10
[52] U.S. Cl. .................................. 16/329; 16/321; 16/331
[58] Field of Search ............................. 16/329, 321, 327, 16/328, 330, 331, 332, 342, 344

[56] References Cited

U.S. PATENT DOCUMENTS

| | | | |
|---|---|---|---|
| 365,158 | 6/1887 | Van Duzer | 16/330 |
| 659,144 | 10/1900 | Golden | 16/331 |
| 3,628,845 | 12/1971 | Grimm | 16/312 |
| 4,501,045 | 2/1985 | Boyer | 16/331 |
| 5,259,019 | 11/1993 | Stilley | 16/327 |
| 5,317,785 | 6/1994 | Kobayashi | 16/329 |
| 5,640,690 | 6/1997 | Kudrna | 16/321 |

FOREIGN PATENT DOCUMENTS

| | | | |
|---|---|---|---|
| 1444556 | 8/1976 | United Kingdom | 16/330 |

*Primary Examiner*—Chuck Mah

[57] ABSTRACT

A hinge assembly which has a limited number of stable positions and in which the hinge automatically moves to the closest of such stable positions is disclosed. The movement of the hinge is accomplished in one illustrative embodiment by positioning the protrusion on one of a pair of ramps inclined opposite to one another and toward the adjacent recess so that the parts of the hinge rotate relative to one another, moving the protrusion into the adjacent recess. The protrusion is pressed against the ramps and the grooves by a connecting portion that joins the arm portions and is flexed when the hinge parts are assembled so as to bias the arm portions toward one another.

10 Claims, 3 Drawing Sheets

HINGE ASSEMBLY

TECHNICAL FIELD

This invention relates to hinges and in particular to hinges having a multiple of stable positions.

BACKGROUND OF THE INVENTION

A hinge of this type is known comprising a first discrete part that includes a pair of flexible arm portions. The hinge further comprises a second discrete part that includes a rigid portion that is straddled by and captured between the flexible arm portions of the first part. Each arm portion includes an axle that is accommodated by a complementary opening in the rigid portion. This enables the two parts of the hinge to rotate relative to one another.

The surface of each arm portion facing the rigid portion includes a spherical protrusion adjacent to the axle that is pressed against the abutting surface of the rigid portion surrounding the opening. Each abutting surface of the rigid portion is flat and extends in a single plane except for two spherical recesses that are spaced from one another. The spherical recesses are located so that when the two parts of the hinge are rotated relative to one another, the spherical protrusion on each arm portion may be moved into juxtaposition with one or the other of the spherical recesses. In such a position, the spherical protrusion moves into the spherical recess and holds the hinge in that position, providing resistance to further rotation of the two parts of the hinge relative to one another.

Thus the interaction between the protrusions on the arm portions with the recesses on the rigid portion is intended to provide the hinge with two distinct stable positions, such as, a particular open position and a closed position. However, resistance to rotation of the two parts of the hinge relative to one another also exists when the protrusions on the arm portions are pressed against the flat surface of the rigid portion that extends in a single plane on each side of the recesses. As a result, this hinge essentially has an infinite number of stable positions, two of which are defined by the interaction between the protrusions and the recesses.

SUMMARY OF THE INVENTION

A hinge assembly in accordance with the present invention provides an improvement over the prior art hinge design in that the hinge assembly of our invention has a limited number of stable positions and the hinge automatically moves to the closest of such stable positions. This is accomplished in one illustrative embodiment by the surface between the recesses being a pair of ramps inclined opposite to one another and toward the adjacent recess. When the protrusion is positioned on one of the ramps, the interaction with the ramp results in the rotation of the parts of the hinge relative to one another so as to move the protrusion into the adjacent recess. The protrusion is pressed against the ramps and the grooves by a connecting portion that joins the arm portions and is flexed when the hinge parts are assembled so as to bias the arm portions toward one another.

DETAILED DESCRIPTION OF THE DRAWINGS

Figure 1:
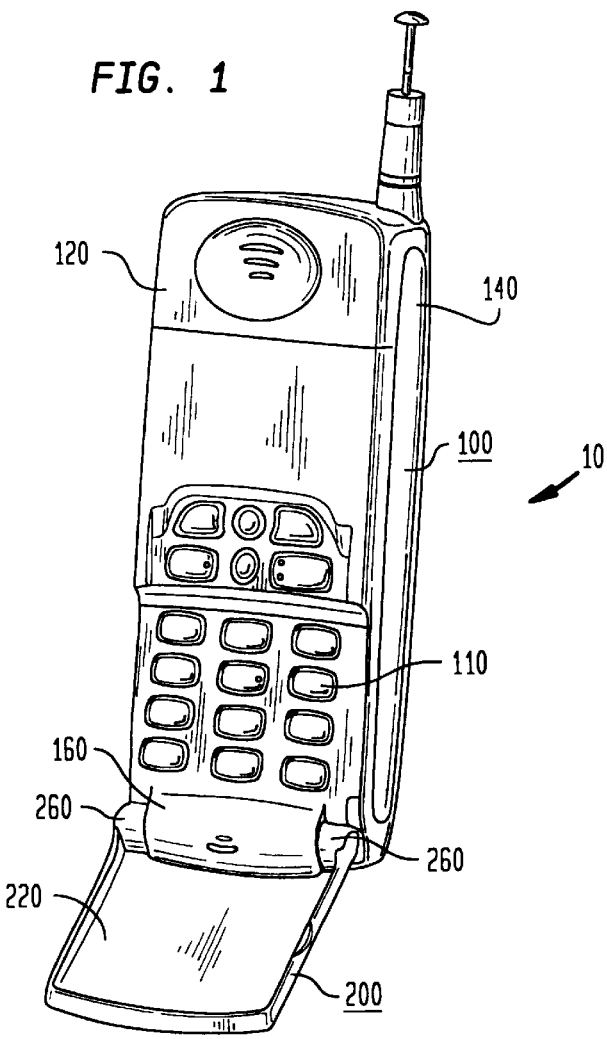
FIG. 1 is a perspective view of a wireless telephone handset that incorporates a hinge assembly in accordance with the present invention, the handset comprising a base and a flap. The flap rotates between a closed position in which it covers a pushbutton dial of the handset and an open position, shown, in which the dial is exposed for use.

Referring to FIG. 1, one application for the hinge assembly of the present invention is in a wireless telephone handset 10 comprising a base 100 and a flap 200 that are joined together by the hinge assembly. The base includes a pushbutton dial 110 that is used to transmit signals for the purpose of establishing a connection with a distant entity and providing information once the connection is established. The flap 200 rotates between a closed position in which it covers the dial 110 and thereby serves to prevent inadvertent operation of the pushbuttons when the handset 10 is not in use, and an open position, shown, in which ready access to the dial is provided.

Figure 2:
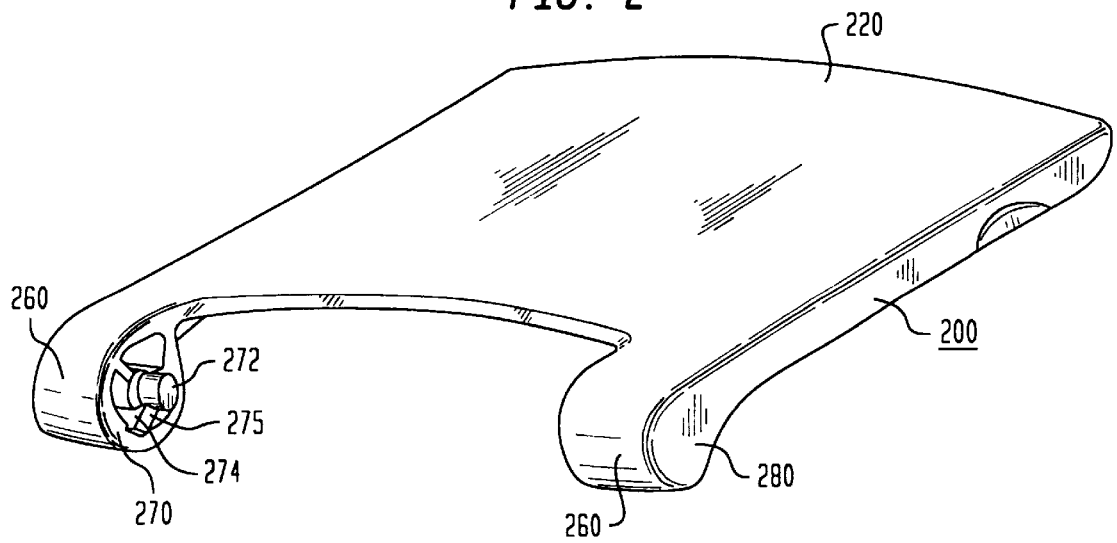
FIG. 2 is a perspective view of the flap showing a first part of the hinge assembly.
Figure 3:
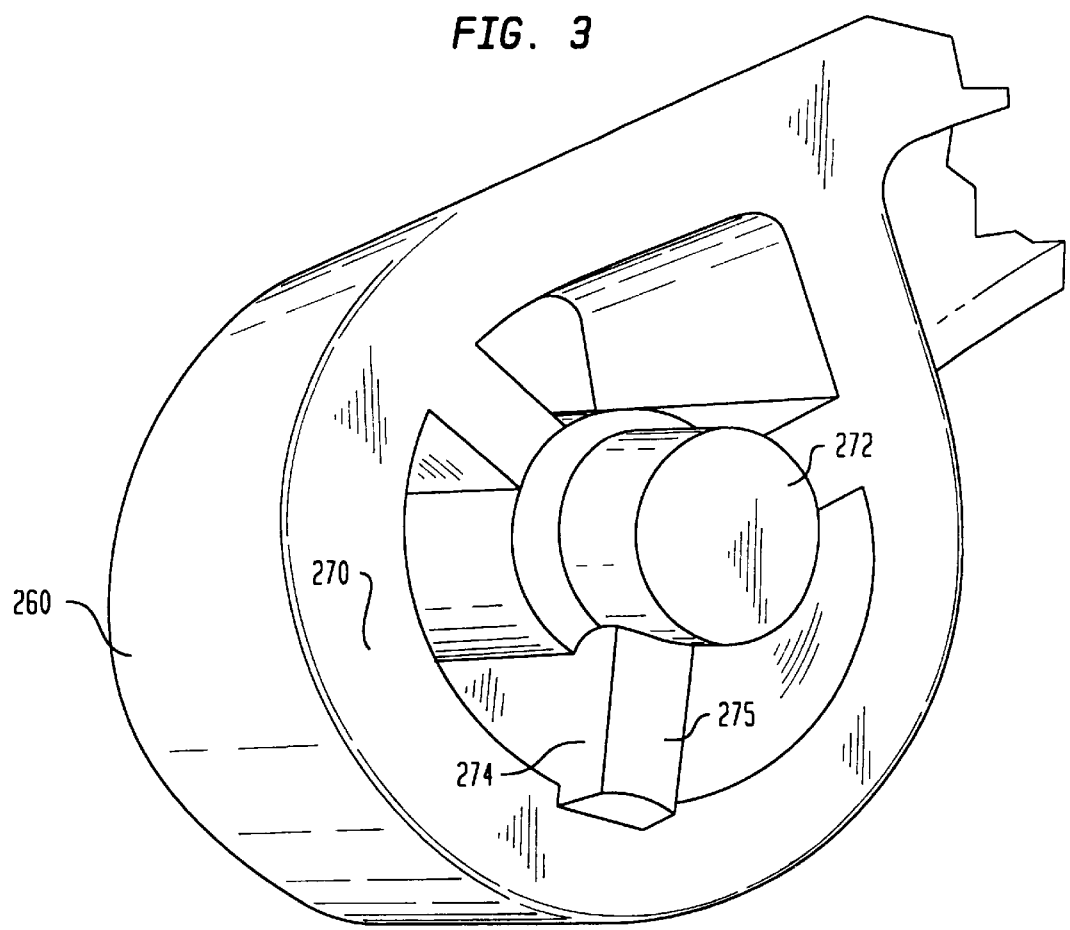
FIG. 3 is an enlarged perspective view of the first part of the hinge assembly.

Referring now to FIG. 2 and FIG. 3, the flap 200 comprises a body portion 220 and a pair of spaced arm portions 260 at one end of the body portion. The body portion 220 is bowed, resulting in the surface facing the dial 110 being concave and the opposite surface being convex. The arm portions 260 extend from the sides of the body portion 220 and are identically configured. The arm portions 260 have a truncated cone shape with the inwardly facing surfaces 270 having a larger diameter than the outwardly facing surfaces 280. The inwardly facing surfaces 270 include central cylindrical axles 272 that extend toward and are axially aligned with one another. The inwardly facing surfaces 270 further include linear protrusions 274 that extend radially from their adjacent axles 272 and toward one another. The protrusions 274 extend a lesser distance from their facing surface 270 than the axles 272 and their inwardly facing surfaces 275 are rounded to provide radially extending cylindrical surfaces.

Referring again to FIG. 1, the housing for the base 100 comprises a face portion 120 and a back portion 140. The end of the face portion 120 adjacent to the dial 110 has a rigid intermediate portion 160 to which the flap 200 is joined.

Figure 4:
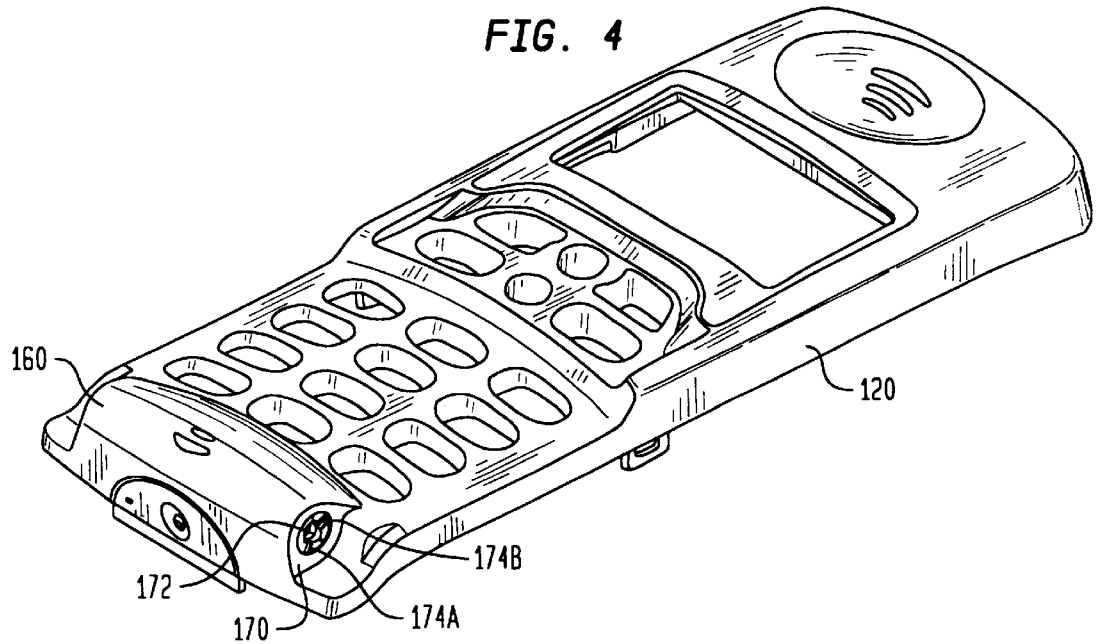
FIG. 4 is a perspective view of the face portion of the handset housing, showing a second part of the hinge assembly.
Figure 5:
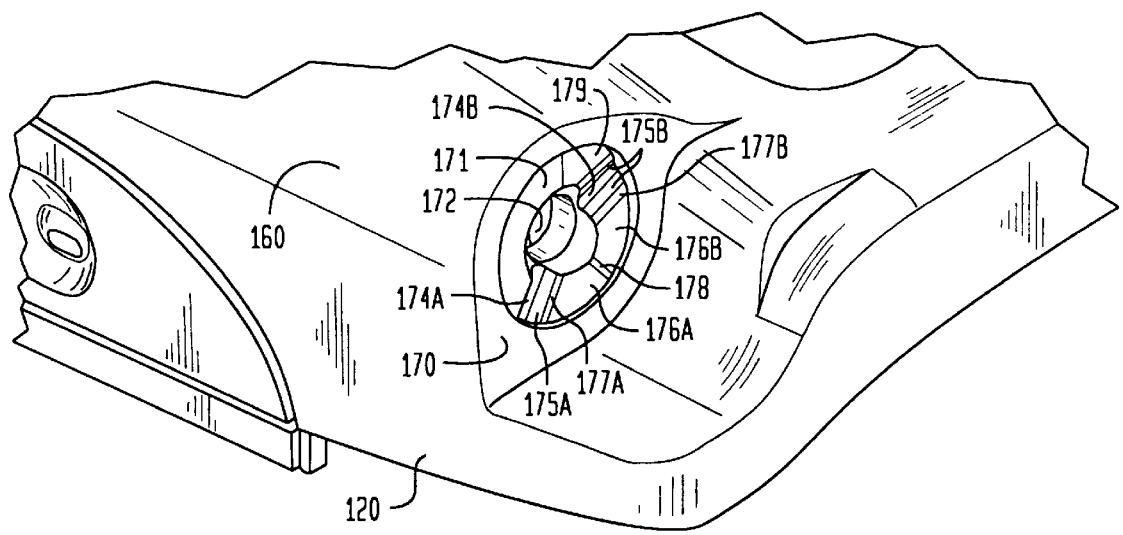
FIG. 5 is an enlarged perspective view of the second part of the hinge assembly.

Referring to FIG. 4 and FIG. 5, the intermediate portion 160 is a cylindrical protuberance, the axis of which extends transverse to the length of the face portion 120. The ends of the intermediate portion 160 have outwardly facing surfaces 170 that are identically configured. The surfaces 170 have axially aligned cylindrical openings 172 that are of a diameter to accommodate and conform to the axles 272 of the arm portions 260 (FIGS. 2 and 3).

The outwardly facing surfaces 170 also have a pair of spaced linear recesses 174A and 174B that extend radially from the openings 172. As seen most clearly in FIG. 5 and FIG. 6, the recesses 174A and 174B comprise V-shaped grooves respectively having flat sides 175A and 175B, the sides being joined by a rounded bottom.

The portion of the outwardly facing surfaces 170 between the recesses 174A and 174B comprises a pair of ramps 176A and 176B. The ramps 176A and 176B are inclined opposite to one another and toward the adjacent recesses 175A and 175B respectively. The incline of the ramps 176A and 176B is not as steep as that of the sides 175A and 175B and the ramps are respectively joined to the adjacent side by rounded edges 177A and 177B. Finally, the ramps 176A and 176B are themselves joined by a rounded edge 178.

The side 175B of the recess 174B that is opposite to the ramp 176B is joined to a ramp 179 that is also inclined toward the recess 174B. A flat surface 171, which lies in a single plane, extends between the ramp 179 and a side 175A of the recess 174A. The plane of the surface 171 extends perpendicular to the axis of the cylindrical opening 172.

Referring now to FIGS. 2 and 4, the spacing between the opposed ends of the protrusions 274 of the inwardly facing surfaces 270 of the arm portions 260 of the flap 200 is somewhat less than the spacing between the bottoms of the opposed recesses 174A and 174B in the outwardly facing surfaces 170 of the intermediate portion 160 of the face portion 120. Consequently, when the flap 200 is joined to the face portion 120 by positioning the intermediate portion 160 between the arm portions 260 and inserting the axles 272 into the openings 172, the body portion 220 must be flexed to reduce the curvature of its bowed surface and thereby increase the distance between the opposed ends of the protrusions 274. The flexed body portion 220 thereby serves to press the protrusions 274 against whatever portion of outwardly facing surfaces 170 they are positioned on.

Figure 6:
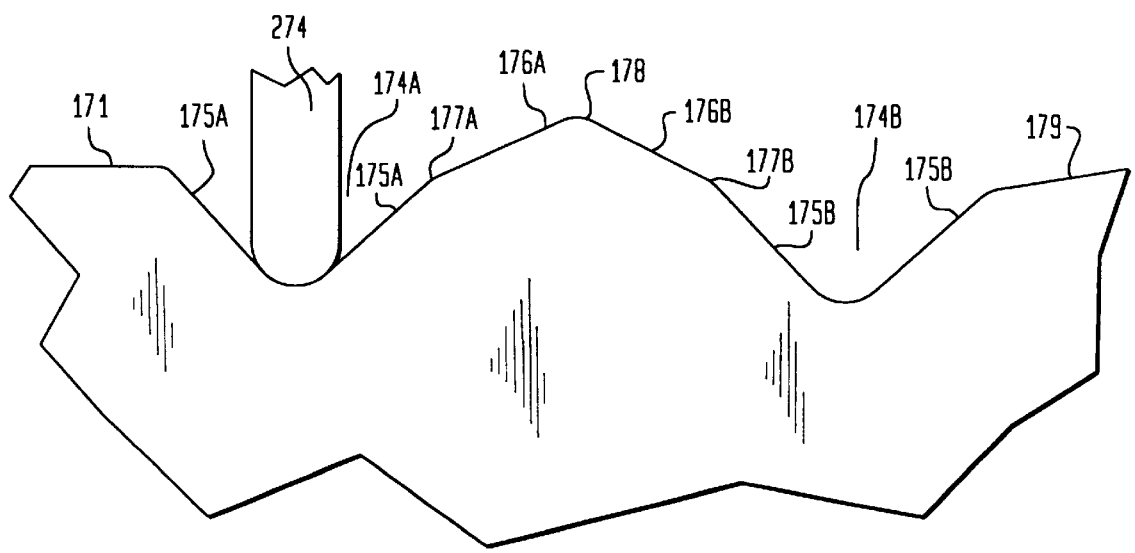
FIG. 6 is a schematic view showing the profile of the portions of the two parts of the hinge assembly that interact with one another.

Turning to FIGS. 1 and 6, when the flap 200 is rotated to the position in which it covers the dial 110 of the handset 100, the protrusions 274 are placed in juxtaposition with the recesses 174A. As a result of the force generated by the flexed body portion 220, the protrusions 274 are pressed into the juxtaposed recesses 174A. When the flap 200 is in this position, it can only be rotated away from the dial 110. Such rotation moves the protrusions 274 to the right as viewed in FIG. 6. The protrusions 274 must therefore be moved up the right sides 175A of the recesses 174A, over the rounded edges 177A and up the ramps 176A. This further flexes the body portion 220 of the flap, increasing the pressure of the protrusions 274 against these surfaces. As a result, if the flap 200 is released when the protrusion is positioned on these surfaces, the flap will automatically move back to the closed position. That is, the protrusions 274 will move down the ramps 176A, the rounded edges 177A and the adjoining sides 175A and settle into the recesses 174A. This interaction provides the flap 200 with a first stable position.

Once the flap 200 is rotated to a position beyond the rounded edges 178, the rounded edges 178 being the point of greatest flexing of the body portion 220, the protrusions 274 move down the ramps 176B, over the rounded edges 177B, down the adjoining side 175B and into juxtaposition with recesses 174B. The movement of the protrusions 274 over these surfaces reduces the flexing of the body portion 220, and thus if the flap is released when the protrusions are on these surfaces the flap 200 will automatically move to its open position shown in FIG. 1, in which position the protrusions 274 are pressed into the juxtaposed recesses 174B.

Furthermore, if the flap 200 is rotated beyond its open position, it is seen from FIG. 6 that the protrusions 274 must move up the right sides 175B of the recesses 174B and up the ramps 179. Further rotation of the flap 200 is prevented by the engagement of the flap with the face portion 120 of the housing 100. This is the overtravel position of the flap 200, and if the flap is released in this position, it will automatically move to the open position. The foregoing interaction provides the flap 200 with a second stable position. The fact that the ends of the protrusions 274 are round and the sides of the recesses 174A and 174B are flat increases the stability of both positions. It is clear that if the protrusions 274 are positioned on the rounded edge 178, the flap 200 is in an unstable position and it will automatically move to one or the other of the two stable positions.

What is claimed is:

1. A hinge assembly comprising:

a first part including a pair of spaced arms having a common axis;

a second part including an intermediate portion that is straddled by and captured between the arms of the first part in a manner that permits the first and second parts to rotate relative to one another about the common axis of the arms, the positioning of the intermediate portion between the spaced arms of the first part causing the arms to be biased toward the intermediate portion;

the arms and the intermediate portion having opposed facing surfaces in close proximity to one another, at least one of the facing surfaces having a protrusion, and the facing surface opposed to the protrusion having both a recess for accommodating the protrusion and a ramp adjacent to the recess whereby when the protrusion is positioned on the ramp, the interaction between the protrusion and the ramp results in the rotation of the first and second parts of the hinge assembly relative to one another so as to move the protrusion into the recess.

2. A hinge assembly as in claim 1 wherein the arms of the first part are joined by an integral connecting portion that serves to press the surfaces of the arms facing the opposing surfaces of the intermediate portion against the opposing surfaces of the intermediate portion.

3. A hinge assembly as in claim 2 wherein the connecting portion is bowed and the connecting portion is flexed to reduce the curvature of the bow when the intermediate portion of the second part is straddled by and captured between the arms of the first part, this flexing serving to press the arms against the intermediate portion.

4. A hinge assembly as in claim 1 wherein the opposed facing surfaces of the intermediate portion are integral to the intermediate portion and the opposed facing surfaces of the arms are integral to the arms.

5. A hinge assembly as in claim 1 wherein the intermediate portion is a unitary member that includes an integral facing surface having the recess and the ramp adjacent to the recess.

6. A hinge assembly comprising:

a first part including a pair of spaced arms having a common axis;

a second part including an intermediate portion that is straddled by and captured between the arms of the first part in a manner that permits the first part and second part to rotate relative to one another about the common axis of the arms;

the arms and the intermediate portion having opposed facing surfaces in close proximity to one another, each facing surface of the arms and its associated arm being a unitary entity and the opposed facing surfaces of the intermediate portion and the intermediate portion being a unitary entity at least one of the facing surfaces having a protrusion and the facing surface opposed to the protrusion having a recess for accommodating the protrusion, the positioning of the intermediate portion between the arms resulting in one of the facing surfaces being biased toward the opposed facing surface.

7. A hinge assembly as in claim 6 wherein the positioning of the intermediate portion between the arms deflects the arms away from one another to bias the arms against the intermediate portion whereby the facing surfaces of the arms are biased against the facing surfaces of the intermediate portion.

8. A hinge assembly as in claim 6 wherein the arms of the first part are joined by an integral connecting portion that serves to deflect the surfaces of the arms facing the opposing surfaces of the intermediate portion against the opposing surfaces of the intermediate portion.

9. A hinge assembly as in claim 8 wherein the connecting portion is bowed and the connecting portion is flexed to reduce the curvature of the bow when the intermediate portion is straddled by and captured between the arms, this flexing serving to press the arms against the intermediate portion.

10. A hinge assembly comprising:

a first part including a pair of spaced arms having a common axis;

a second part including an intermediate portion that is straddled by and captured between the arms of the first part in a manner that permits the first part and second part to rotate relative to one another about the common axis of the arms;

the arms and the intermediate portion having opposed facing surfaces in close proximity to one another, at least one of the facing surfaces having a protrusion and the facing surface opposed to the protrusion having a recess for accommodating the protrusion, the positioning of the intermediate portion between the arms causing the arms to be deflected away from one another to bias the arms against the intermediate portion whereby the facing surfaces of the arms are biased toward the facing surfaces of the intermediate portion.

* * * * *